(12) United States Patent
Kim

(10) Patent No.: US 12,371,359 B2
(45) Date of Patent: Jul. 29, 2025

(54) SYSTEMS AND METHODS FOR WATER FILTRATION

(71) Applicant: YESONE CORPORATION, Whittier, CA (US)

(72) Inventor: Un Seok Kim, Tustin, CA (US)

(73) Assignee: YESONE CORPORATION, Whittier, CA (US)

( * ) Notice: Subject to any disclaimer, the term of this patent is extended or adjusted under 35 U.S.C. 154(b) by 0 days.

(21) Appl. No.: 18/601,192

(22) Filed: Mar. 11, 2024

(65) Prior Publication Data

US 2024/0308892 A1 Sep. 19, 2024

Related U.S. Application Data

(60) Provisional application No. 63/452,404, filed on Mar. 15, 2023.

(51) Int. Cl.
*C02F 9/00* (2023.01)
*C02F 1/00* (2023.01)
*C02F 1/32* (2023.01)
*C02F 1/74* (2023.01)
*C02F 1/78* (2023.01)

(52) U.S. Cl.
CPC ............... *C02F 9/00* (2013.01); *C02F 1/001* (2013.01); *C02F 1/32* (2013.01); *C02F 1/74* (2013.01); *C02F 1/78* (2013.01)

(58) Field of Classification Search
None
See application file for complete search history.

(56) References Cited

U.S. PATENT DOCUMENTS

| | | | |
|---|---|---|---|
| 4,979,639 A | 12/1990 | Hoover et al. | |
| 2001/0015211 A1* | 8/2001 | Schuler | B08B 3/12 134/184 |
| 2002/0158018 A1* | 10/2002 | Abramowitz | C02F 1/4618 210/639 |
| 2004/0084475 A1 | 5/2004 | Bethuy et al. | |
| 2009/0289011 A1* | 11/2009 | Avakian | C02F 9/00 210/182 |

(Continued)

OTHER PUBLICATIONS

"Vacuum Break," Ozone Systems: Installation & Owner's Manual, ClearWater Tech, LLC., 1993, 3 pages.

(Continued)

*Primary Examiner* — Peter Keyworth
(74) *Attorney, Agent, or Firm* — Womble Bond Dickinson (US) LLP

(57) ABSTRACT

A water filtering system includes: at least one filter; a first water tank to store water filtered by the at least one filter; a second water tank to store water, the second water tank being in fluid communication with the first water tank; an air generator to aerate the water stored in the first water tank by generating one or more air bubbles to agitate the water stored in the first water tank; an ozone generator including an ozone injector to inject ozone generated by the ozone generator into water flowing from the first water tank to the second water tank to generate ozonated water that is stored in the second water tank; and a dispenser to dispense various kinds of water generated from the ozonated water stored in the second water tank.

14 Claims, 6 Drawing Sheets

(56) References Cited

U.S. PATENT DOCUMENTS

| | | | |
|---|---|---|---|
| 2013/0337518 A1* | 12/2013 | Razavi-Shirazi | C12P 7/46 |
| | | | 435/141 |
| 2015/0306341 A1* | 10/2015 | Hoefler | C02F 9/00 |
| | | | 600/21 |
| 2022/0024748 A1 | 1/2022 | Fantappie et al. | |

OTHER PUBLICATIONS

US Office Action dated Oct. 25, 2024, issued in U.S. Appl. No. 18/752,550 (12 pages).

* cited by examiner

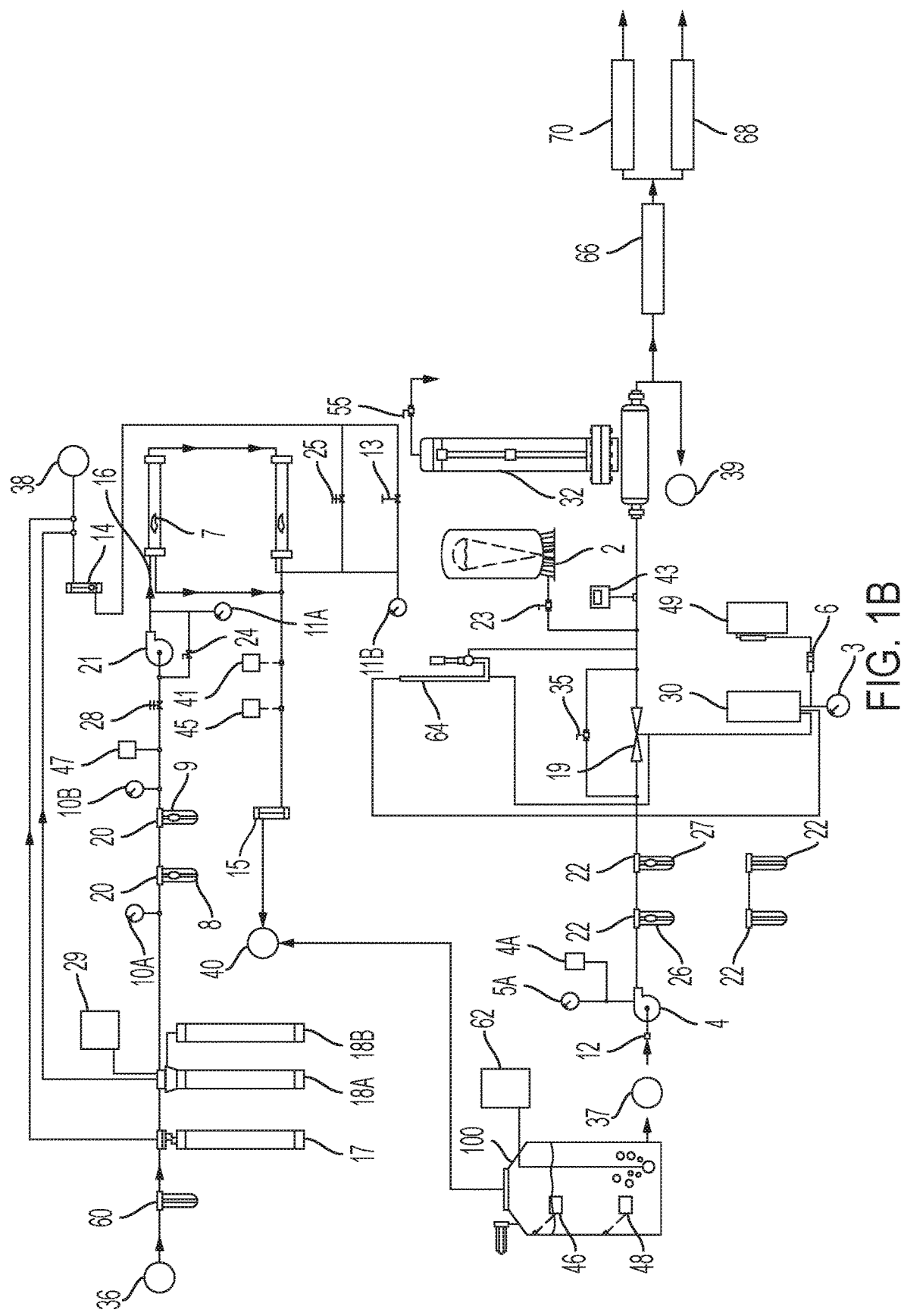

SYSTEMS AND METHODS FOR WATER FILTRATION

CROSS-REFERENCE TO RELATED APPLICATION(S)

This application claims priority to and the benefit of U.S. Provisional Application No. 63/452,404, filed on Mar. 15, 2023, entitled "SYSTEMS AND METHODS FOR WATER FILTRATION," the entire disclosure of which is incorporated by reference herein.

BACKGROUND

1. Field

Aspects of one or more embodiments of the present disclosure are directed to systems and methods for water filtration.

2. Description of Related Art

Water stores have become increasingly popular to provide various kinds of water to customers. For example, water stores may include complex water filtration equipment that is used to filter and remove contaminants and the like from tap water. The filtered water may then be further processed, for example, to generate alkaline water and the like. With the increasing popularity of alkaline water for health benefits and the like, improved systems and methods for water filtration may be desired.

The above information disclosed in this Background section is for enhancement of understanding of the background of the present disclosure, and therefore, it may contain information that does not constitute prior art.

SUMMARY

Aspects of one or more embodiments of the present disclosure are directed to water filtration apparatuses, systems, and methods, and more particularly, to water filtration apparatuses, systems, and methods for producing various kinds of water, such as purified water, oxygenated water, and/or alkaline water.

According to one or more embodiments of the present disclosure, a water filtering system includes: a first water tank configured to store water filtered by the at least one filter; a second water tank configured to store water, the second water tank being in fluid communication with the first water tank; an air generator configured to aerate the water stored in the first water tank by generating one or more air bubbles to agitate the water stored in the first water tank; an ozone generator including an ozone injector configured to inject ozone generated by the ozone generator into water flowing from the first water tank to the second water tank to generate ozonated water that is stored in the second water tank; and a dispenser configured to dispense various kinds of water generated from the ozonated water stored in the second water tank.

In an embodiment, the filter may include at least one of a 5-micron filter or a 20-micron filter.

In an embodiment, the second water tank may include a reverse osmosis (RO) tank.

In an embodiment, the water filtering system may further include a UV system configured to emit UV light to expose water flowing from the second water tank to the dispenser to the UV light.

In an embodiment, the dispenser may be configured to dispense at least two of purified water, oxygenated water, or alkaline water generated from the ozonated water.

In an embodiment, the water filtering system may further include an oxygen generator configured to generate oxygen that may be injected into the ozonated water flowing from the second water tank to the dispenser to generate oxygenated water.

In an embodiment, the water filtering system may further include an alkaline system including: a water regulator configured to control a flow rate of the water stored in the second water tank flowing into the alkaline system; and an alkaline filter configured to introduce minerals into the water introduced into the alkaline system from the second water tank to convert the water into the alkaline water.

In an embodiment, the water filtering system may further include an ozone generator protector configured to prevent a reverse flow of water from flowing from the ozone injector to the ozone generator by draining the water before flowing to the ozone generator.

According to one or more embodiments of the present disclosure, a method of generating drinkable water includes: filtering water with at least one filter; storing, in a first water tank, the water filtered by the at least one filter; aerating the water stored in the first water tank by generating one or more air bubbles to agitate the water stored in the first water tank; transporting, to a second water tank in fluid communication with the first water tank, the water stored in the first water tank; injecting ozone into the water flowing from the first water tank to the second water tank to generate ozonated water; storing the ozonated water in the second water tank; and dispensing, by a dispenser, various kinds of water generated from the ozonated water stored in the second water tank.

In an embodiment, the filter may include at least one of a 5-micron filter or a 20-micron filter.

In an embodiment, the second water tank may include a reverse osmosis (RO) tank.

In an embodiment, the method may further include emitting UV light to expose the water flowing from the second water tank to the dispenser.

In an embodiment, the method may further include: receiving a selection for at least one kind of water from among purified water, oxygenated water, or alkaline water; and dispensing, by the dispenser, the selected kind of water generated from the ozonated water.

In an embodiment, the method may further include injecting oxygen into the ozonated water flowing from the second water tank to the dispenser to generate oxygenated water.

In an embodiment, the method may further include: controlling a flow rate of the ozonated water flowing from the second water tank into an alkaline system; and introducing minerals into the water flowing into the alkaline system to generate alkaline water.

In an embodiment, the method may further include preventing a reverse flow of the ozonated water from flowing into an ozone generator configured to generate the ozone by draining the ozonated water before flowing into the ozone generator.

According to one or more embodiments of the present disclosure, a water filtering system includes: at least one filter; a first water tank configured to store water filtered by the at least one filter; a second water tank configured to store water, the second water tank being in fluid communication with the first water tank; an ozone generator including an ozone injector configured to inject ozone generated by the ozone generator into water flowing from the first water tank to the second water tank to generate ozonated water that is stored in the second water tank; a UV system configured to emit UV light to expose the ozonated water flowing out from the second water tank to the UV light; and a dispenser configured to dispense various kinds of water generated from the ozonated water exposed to the UV light.

In an embodiment, the dispenser may be configured to dispense at least two of purified water, oxygenated water, or alkaline water generated from the ozonated water exposed to the UV light.

In an embodiment, the water filtering system may further include an oxygen generator configured to generate oxygen that may be injected into the ozonated water exposed to the UV light to generate oxygenated water.

In an embodiment, the water filtering system may further include an alkaline system including: a water regulator configured to control a flow rate of the ozonated water exposed to the UV light flowing into the alkaline system; and an alkaline filter configured to introduce minerals into the ozonated water exposed to the UV light that is introduced into the alkaline system to generate the alkaline water. The water regulator may be configured to adjust a pH value of the alkaline water by controlling the flow rate. The flow rate may be increased to lower the pH value, and the flow rate may be decreased to increase the pH value.

BRIEF DESCRIPTION OF THE DRAWINGS

The above and other aspects and features of the present disclosure will be more clearly understood from the following detailed description of the illustrative, non-limiting embodiments with reference to the accompanying drawings, in which:

FIG. 1B is a flow diagram of a water filtration system according to one or more embodiments;

DETAILED DESCRIPTION

Figure 1A:
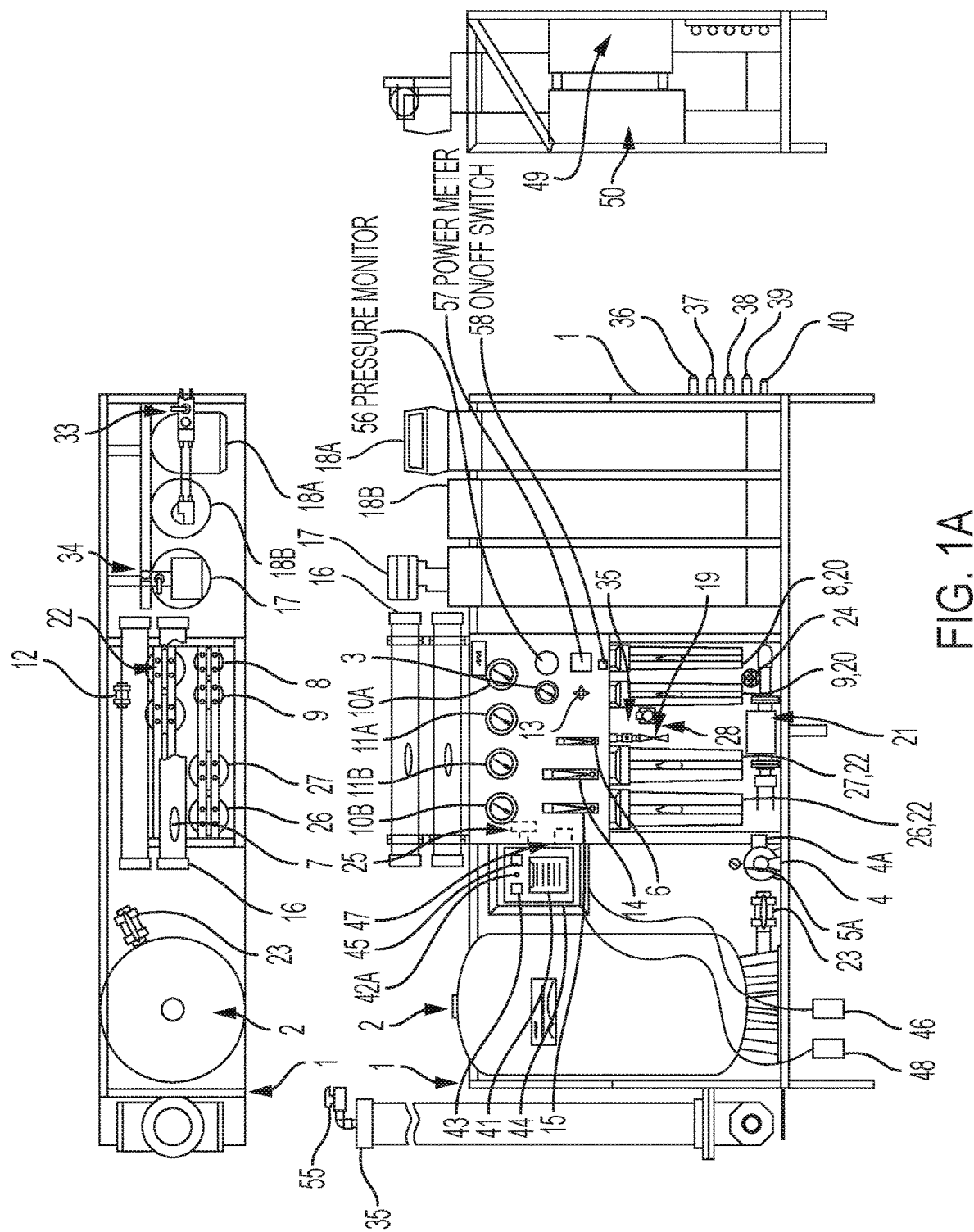
FIG. 1A is a schematic diagram of a water filtration system according to one or more embodiments.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

Figure 2:
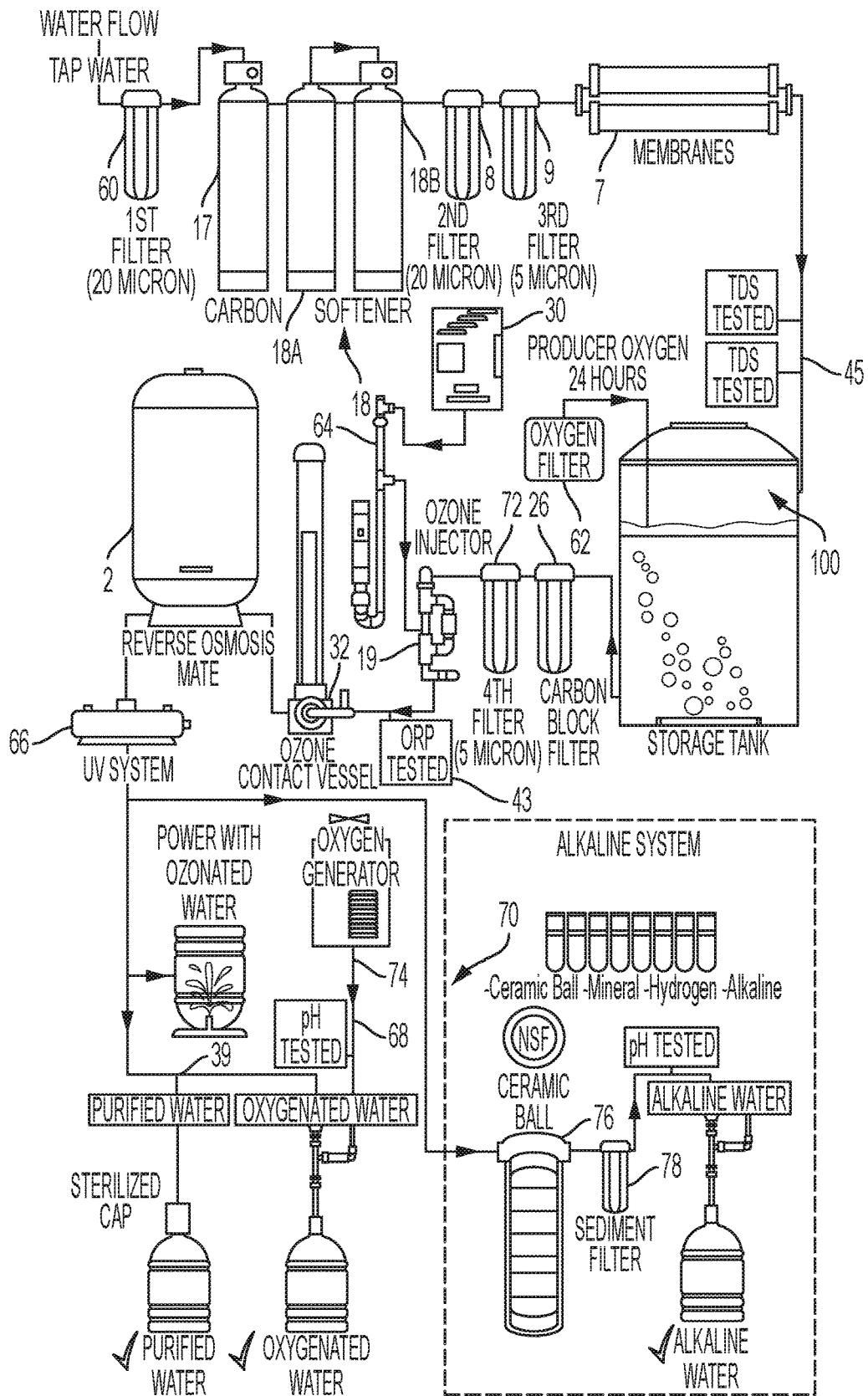
FIG. 2 is a flow diagram of a water filtration system according to one or more embodiments.

FIG. 1A is a schematic diagram of a water filtration system according to one or more embodiments. FIG. 1B is a flow diagram of a water filtration system according to one or more embodiments. FIG. 2 is a flow diagram of a water filtration system according to one or more embodiments.

Referring to FIGS. 1A and 1B, the water filtration system may include a frame 1, a pressure tank 2, an ozone vacuum gauge 3, a repressurizing pump 4, a differential pressure switch 4A, a repressurizing pump pressure gauge 5A, an ozone air meter 6, a reverse osmosis (RO) membrane 7, a 20 micron filter 8, a 5 micron filter 9, a prefilter pressure gauge 10A, a postfilter pressure gauge 10B, a premembrane pressure gauge 11B, a postmembrane pressure gauge 11A, a check value 12, a high pressure regulator 13, a reject water flowmeter 14, a product water flow meter 15, a pressure vessel 16, a carbon block filter system 17, a first softener tank 18A, a second softener tank 18B, an ozone injector 19, a filter housing 20, a high pressure pump 21, a filter housing 22, a pressurizing valve 23, a by-pass valve 24, an autoflush valve 25, a carbon block filter 26, a 5 micron filter 27, a feed water solenoid valve 28, a salt tank 29, an ozone generator 30, a contact tank 32, a softener by-pass valve meter 33, a carbon block filter by-pass valve timer 34, an ozone dosage by-pass valve 35, a feed water connection (1") 36, a product water from storage tank to repressurizing pump connection (1") 37, a reject water to drain connection (1") 38, a purified water to dispensers connection (1") 39, an RO product water outlet to tank connection (½") 40, a system control monitor 41, a pressurizing system on/off indicator 42A, an oxidation reduction potential ORP controller 43, a control panel 44, a total dissolved solution (TDS) meter 45, a high level float switch 46, a low pressure switch 47, a low level float switch 48, an electrical box 49, a vent valve 55, a pressure monitor 56, a power meter 57, and an on/off switch 58. In some embodiments, the water filtration system may further include a first filter 60, a natural fresh air generator 62, an ozone generator protector 64, an ultraviolet (UV) light system 66, an oxygen system 68, an alkaline system 70, and a storage tank 100.

As shown in FIGS. 1B and 2, in some embodiments, water (e.g., tap water) may be fed into the water filtration system through the feed water connection 36. The fed water may be filtered through the first filter 60, which may be a 20 micron filter to remove particles from the water that are 20 microns or larger, and then through the carbon filter system 17. The filtered water may be softened through a dual softener system 18 including the first and second softener tanks 18A and 18B using salt provided from the salt tank 29. Any rejected water from the carbon tank (that removes chlorine inside the tank) 17 and the softener tanks 18A and 18B may be exhausted through the reject water to drain connection 38. The soften water may be provided to the 20 micron filter 8 (which may also be referred to as a second filter), and the 5 micron filter 9 (which may also be referred to as a third filter), before being provided to the RO membrane 7 to generate product water. The product water may be tested by the TDS meter 45 to ensure a purification quality thereof (e.g., <10 PPM of total dissolved solids), and fed to the storage tank 100 via the RO product water outlet to tank connection 40 to be stored therein for further processing as needed or desired.

Still referring to FIGS. 1B and 2, in some embodiments, the product water that is stored in the storage tank 100 may be continuously or substantially continuously aerated and circulated with air by the natural fresh air generator 62 to prevent contamination thereof, and to sustain the quality of the product water stored in the storage tank 100. Further, the storage tank 100 may include the high level float switch 46 and the low level float switch 48 therein, such that the water filtration system may be automatically controlled to generate more or less product water depending on the amount of the product water that is stored in the storage tank 100 as determined by the high level float switch 46.

As shown in FIG. 1B, when it is time to further process the product water (e.g., when the customer is purchasing water, or a level of the desired water for purchasing is low), the product water may be pumped from the storage tank 100 by the repressurizing pump 4 via the product water from storage tank to repressurizing pump connection 37, and may be fed to the carbon block filter 26 and the 5 micron filter 27 (which may also be referred to as a $4^{th}$ filter 72) for further filtering. Ozone generated by the ozone generator 30 may be injected into the filtered water (which may also be referred to as purified water) by the ozone injector 19, and mixed with the filtered (e.g., purified) water in the contact tank 32 (e.g., an ozone contact tank) to remove bacteria from the water. During this process, the ozone generator protector 64 may protect the ozone generator 30 to prevent reverse flow of water when ozone is injected. For example, when the pressure pump turns on, the ozone injector 19 may create a vortex of the water passing through, which creates a suction of ozone into the water. In this case, if the ozone injector 19 malfunctions (e.g., a check valve at the ozone injector 19 malfunctions), water may sit inside the vacuum and may flow into the ozone generator 30, causing damage to the ozone generator 30. The ozone generator protector 64 may prevent the water from sitting inside the vacuum when the ozone injector 19 malfunctions (e.g., the check valve at the ozone injector 19 malfunctions). In some embodiments, the ozone generator protector 64 may be placed or installed between the ozone generator 30 and the ozone injector 19. When the ozone injector 19 malfunctions, the ozone generator protector 64 may drain the water sitting inside the vacuum through a port. In some embodiment, the ozone generator protector 64 may be used to alert an operation error or malfunctioning of the ozone injector 19. For example, when water is drained out of the port of the ozone generator protector 64, it may indicate that the ozone injector 19 is malfunctioning.

The ozonated water may be stored in the pressure tank 2 (e.g., a repressurizing tank) until it is dispensed. For example, the pressure tank 2 may be an RO-Mate to safely dispense the ozonated (e.g., purified) water without contact of oxygen, such that contamination thereof may be prevented or substantially prevented.

The water stored in the pressure tank 2 is provided to the UV system 66 to remove any remaining bacteria and the like therefrom by exposing the water to UV light, and thus, the purified water may be ready to be dispensed or further processed to generate oxygenated water and/or alkaline water. For example, the purified water may be purchased by the customer, or may be further processed to generate the oxygen water and/or the alkaline water. The purified water may be dispensed as-is via the purified water to dispensers connection 39, or may be fed to the oxygen system 68 or the alkaline system 70 for further processing. Here, the purified water may be acidic/neutral, such as 6.4 or 6.5 pH.

As illustrated in FIG. 2, the oxygen system 68 may include an oxygen generator 74. The oxygen generator 74 may generate oxygen that is mixed with the purified water to generate oxygenated water. The generated oxygen may be injected into the water through an injector following Bernoulli's principle. For example, a flow rate of the oxygen generated by the oxygen generator 74 and injected into the purified water may be about 4 LPM. For example, the oxygen concentration of the oxygenated water may be about 30% to about 40%. The oxygenated water may be dispensed to a customer desiring oxygenated water.

Still referring to FIG. 2, the alkaline system 70 may include an alkaline filter 76, and a sediment filter 78. In some embodiments, the alkaline filter 76 may include a ceramic ball filter to introduce (e.g., add) various minerals into the purified water to synthesize with the minerals (e.g., to make the purified water alkaline), and the sediment filter 78 may filter out any fine particles remaining in the alkaline water. Here, because the purified water is used to generate the alkaline water, the alkaline filter 76 may be used rather than another alkaline process, for example, such as electrolysis. For example, because the purified water may be stripped of minerals, the electrolysis process may be ineffective in alkalizing the purified water. Accordingly, in some embodiments, the alkaline filter 76 including the ceramic ball may be used to generate alkaline water from the purified water. In some embodiment, the minerals introduced into the purified water by the alkaline filter 76 may include, for example, calcium (Ca), potassium (K), magnesium (Mg), zinc (Zn), and/or iron (Fe), but the present disclosure is not limited thereto. In some embodiments, the alkaline water generated by the alkaline system 70 may be basic, for example, such as 10 pH or greater. The alkaline water may be dispensed to a customer desiring alkaline water.

Accordingly, in various embodiments, the purified water may be dispensed as-is, may be used to generate and dispense oxygenated water, and/or may be used to generate and dispense alkaline water, depending on the kind of water desired by the customer.

Figure 3:
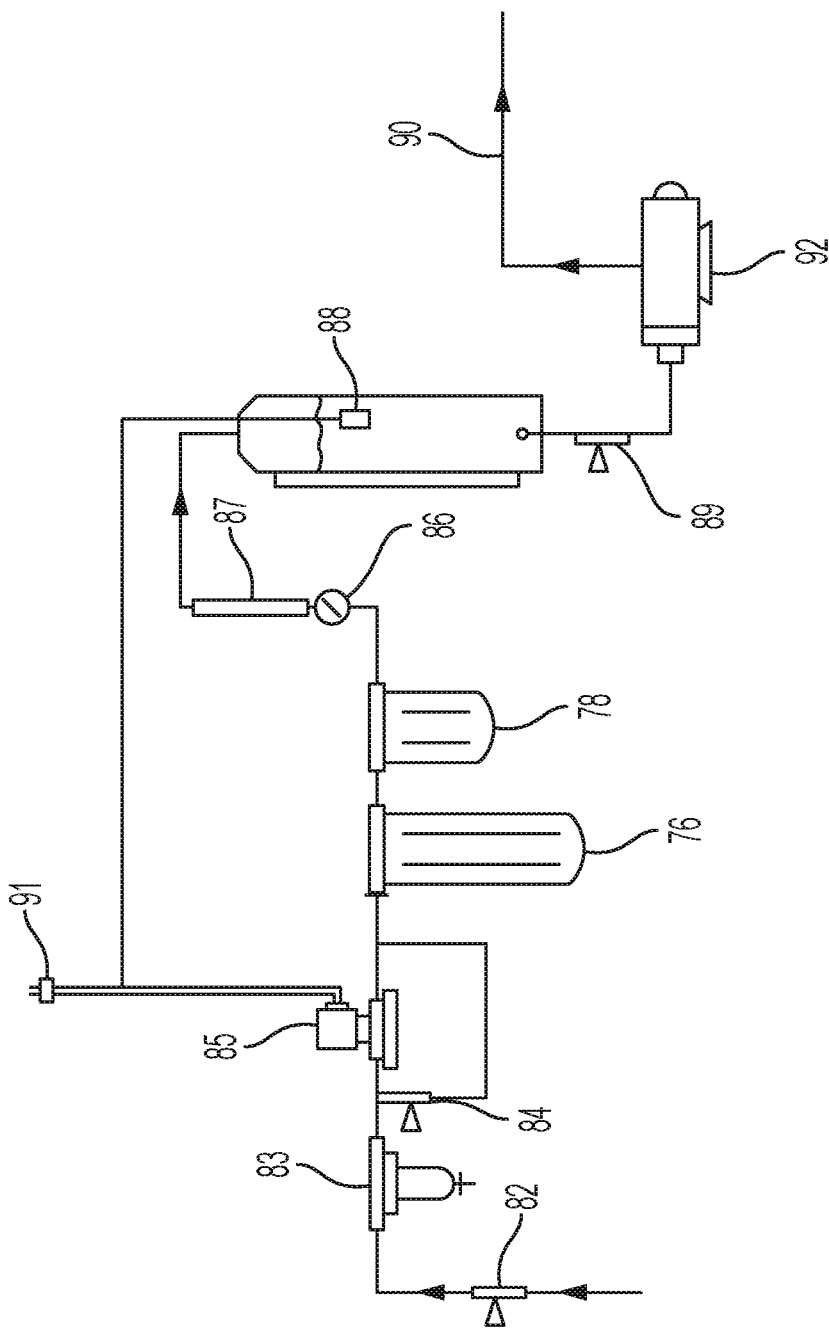
FIG. 3 is a schematic diagram illustrating an automatic alkaline water system according to one or more embodiments.

FIG. 3 is a schematic diagram illustrating an automatic alkaline water system according to one or more embodiments.

Referring to FIG. 3, in some embodiment, an automatic alkaline water system (e.g., such as the alkaline system 70) may include a ball valve 82, a water regulator 83, a bypass ball valve 84, a solenoid valve 85, the alkaline filter 76, the sediment filter 78, a pressure meter 86, a product water meter 87, a high level switch 88, a ball valve to service 89, a dispensing service 90, an AC 120V connector 91, and a motor 92.

The ball valve 82 may feed source water into the automatic alkaline water system to be alkalized into alkaline water. For example, the source water may be the purified water generated by the water filtration system described above, but the present disclosure is not limited thereto, and in another embodiment, the source water may be tap water. In other words, the ball valve 82 may be an emergency valve to shut off the source water that is fed to the automatic alkaline water system in case of an emergency in the entry pipe or the like.

The water regulator 83 may control a flow rate (or pressure) of the source water being fed into the automatic alkaline water system. By controlling the flow rate, the water regulator 83 may control the pH value of the alkaline water flowing out of the alkaline filter 76 and/or the sediment filter 78. For example, when the flow rate is decreased, the pH of the alkaline water may be increased, and when the flow rate is increased, the pH of the alkaline water may be decreased.

The bypass ball valve 84 may provide a path for the source water to bypass the solenoid valve 85, such that the alkaline water may be generated even in case of a failure of the solenoid valve 85. In other words, the bypass ball valve 84 may enable the continued generation of the alkaline water, even while the solenoid valve 85 is being serviced. The solenoid valve 85 may stop the production of the alkaline water, for example, when an alkaline water storage tank is full. For example, when the alkaline water storage tank is full, the high level switch 88 in the alkaline water storage tank may be configured to stop transmitting a signal to the solenoid valve 85, and the solenoid valve 85 may stop the production of the alkaline water when no signal is received from the alkaline water storage tank (e.g., may stop the flow of the source water). In more detail, once the high level switch turns upside down (e.g., to be deactivated), it blocks electricity from passing through the solenoid valve 85 to stop the alkaline water flow.

As described above, the alkaline filter 76 may include a ceramic ball filter to introduce (e.g., add) various minerals into the source water to make the source water alkaline, and the sediment filter 78 may filter out any fine particles remaining in the alkaline water. For example, in some embodiments, the sediment filter 78 may be a 5 micron filter. In some embodiments, the minerals introduced into the source water by the alkaline filter 76 may include, for example, calcium (Ca), potassium (K), magnesium (Mg), zinc (Zn), and/or iron (Fe), but the present disclosure is not limited thereto. As discussed above, the alkaline level (e.g., the pH level) of the alkaline water may be determined by the flow rate controlled by the water regulator 83.

The water regulator 83 may be configured to adjust the flow rate of the source water. For example, an increased flow rate of water results in a faster passage of water through the alkaline filter 76, which limits the time for the minerals to be absorbed. Thus, an increased flow rate results in a lower pH value in the water. In contrast, a decreased flow rate results in a slower passage of water through the alkaline filter 76, which extends the time for the minerals to be absorbed. Thus, a decreased flow rate results in a higher pH value in the water. For example, achieving a pH value of 9.5 or higher may require a flow rate within the range of 1.2-1.3 GPM (Gallons Per Minute), and elevating the flow rate to 1.4-1.6 GPM may yield a pH value ranging from 9.0 to 8.5. Accordingly, the pressure meter 86 may be used to determine whether or not the pressure (or the flow rate) of the alkaline water that is flowing to the alkaline storage water tank is stable (e.g., is at a desired pressure).

As described above, the solenoid valve 85 may stop the production of the alkaline water when the alkaline water storage tank is full. As such, the product water meter 87 may be used to determine (e.g., to visually determine) an amount (e.g., a level) of the alkaline water that is produced (e.g., per minute) and stored in the alkaline storage water tank, and the alkaline storage water tank may include the high level switch 88 therein to determine when the amount (e.g., the level) of the alkaline water stored in the alkaline storage water tank reaches a threshold high level. When the amount (e.g., the level) of the alkaline water stored in the alkaline water storage tank reaches the threshold high level, the alkaline water storage tank may be considered to be full. As such, when the threshold high level is reached, the high level switch 88 may inform (e.g., may signal) the solenoid valve to stop the production of the alkaline water.

The ball valve to service 89 may be an emergency ball valve that stops the flow of the alkaline water out of the alkaline storage water tank. The dispensing service 90 may dispense the alkaline water from the alkaline storage water tank to the customer. The motor 92 may pump the water from the alkaline storage water tank to the dispensing service 90. The AC 120V connector 91 may connect to a 120V power supply to supply power to the solenoid valve 85.

Figure 4A:
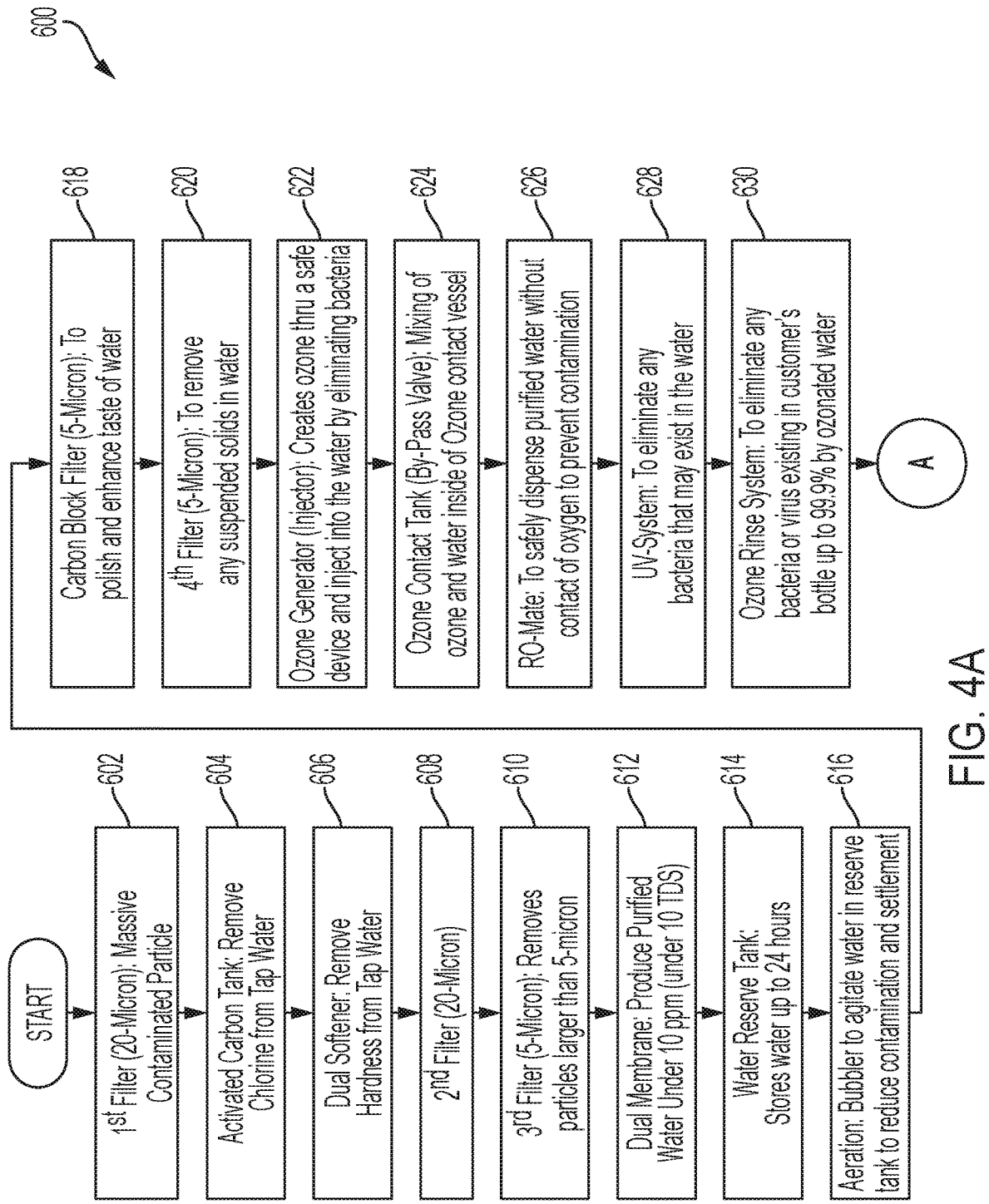
FIGS. 4A and 4B are flow diagrams of a method of generating various kinds of water according to one or more embodiments.
Figure 4B:
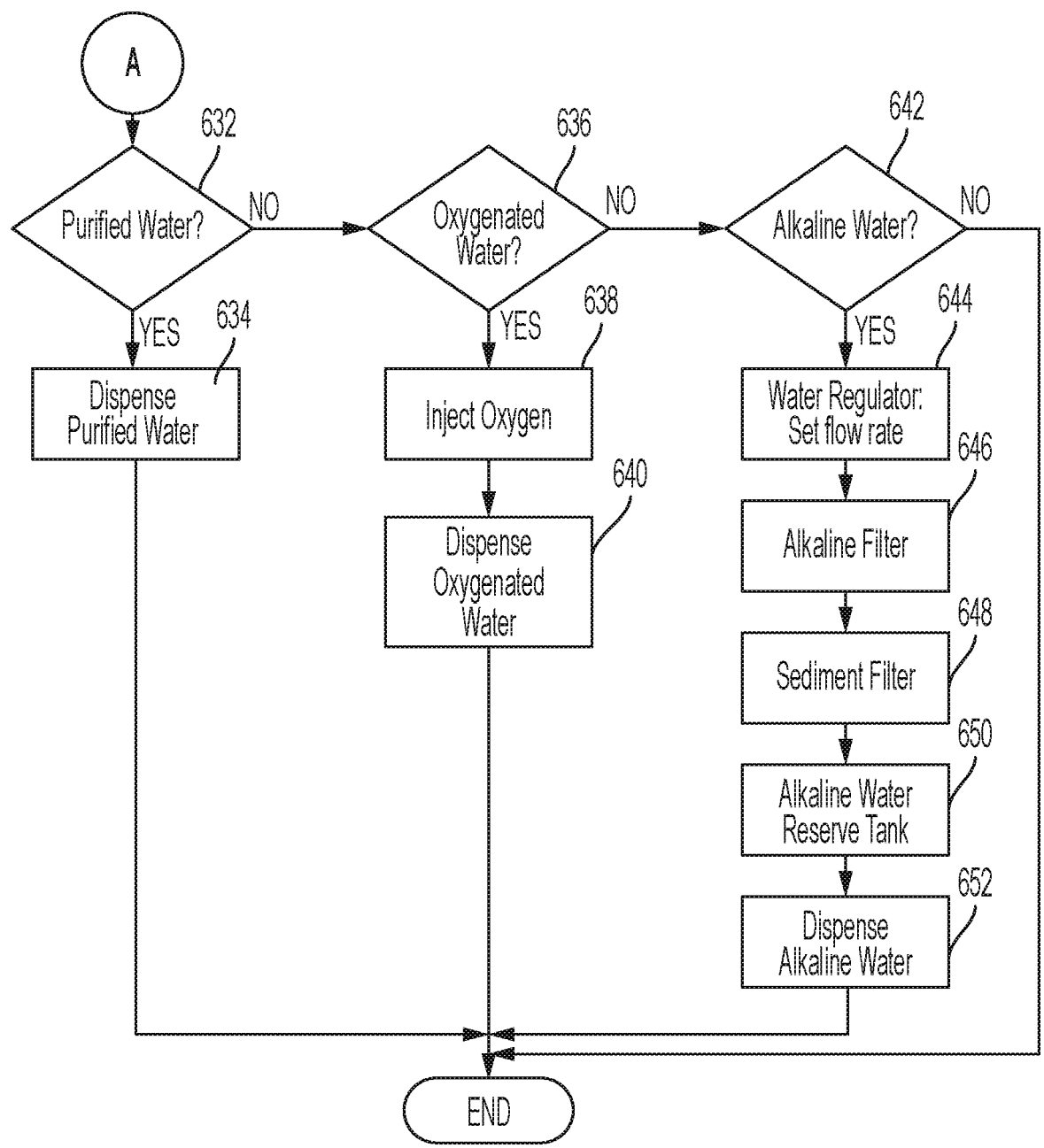

FIGS. 4A and 4B are flow diagrams of a method of generating various kinds of water according to one or more embodiments. However, the present disclosure is not limited to the sequence or number of the operations of the method 600 shown in FIGS. 4A and 4B, and can be altered into any desired sequence or number of operations as recognized by a person having ordinary skill in the art. For example, in some embodiments, the order may vary, some processes thereof may be performed concurrently or sequentially, or the method 600 may include fewer or additional operations.

Referring to FIGS. 4A and 4B, the method 600 may start when water (e.g., tap water) is fed into the water filtration system. The water may first be filtered through a $1^{st}$ filter (e.g., a 20 micron filter) at block 602 to filter out massive contaminated particles from the water. Next, the water may be filtered through an activated carbon tank at block 604 to remove chlorine from the water. The filtered water is then softened through a dual softener system at block 606 to remove hardness from the water. The softened water is then filtered through a $2^{nd}$ filter (e.g., a 20-micron filter) at block 608, and then through a $3^{rd}$ filter (e.g., a 5-micron filter) at block 610 to remove particles from the water that are larger than 5-micron. The filtered water is then fed through a dual membrane at block 612 to produce product water (e.g., which may be purified water) under 10 ppm (e.g., under 10 TDS), and the product water is stored in a water reserve tank at block 614. For example, in some embodiments, the product water may be stored in the water reserve tank 100 for up to 24 hours. In some embodiments, the product water that is stored in the water reserve tank 100 may be aerated at block 616 by a bubbler (e.g., the natural fresh air generator 62) to agitate the water in the water reserve tank 100 to reduce contamination and settlement.

The water stored in the water reserve tank 100 may be fed to a carbon block filter (e.g., a 5 micron filter) at block 618 to polish and enhance the taste of the water. Then, the filtered water may be fed to a $4^{th}$ filter (e.g., a 5-micron filter) at block 620 to remove any suspended solids in the water, and the water output by the $4^{th}$ filter may be injected with ozone at block 622 by an ozone generator (injector), which creates ozone through a safe device, to eliminate or reduce bacteria. The ozone injected water may be provided to an ozone contact tank (by-pass valve) at block 624 to mix the ozone and the water inside of an ozone contact vessel, and the mixed water may be stored in an RO mate at block 626 for safe dispensing without contact of oxygen to prevent contamination.

The water stored in the RO mate may be provided to a UV-system to eliminate any remaining bacteria that may exist in the water at block 628, and may be dispensed or further processed as needed or desired. For example, when a customer purchases water, the customer may provide a bottle for storing the water. In this case, the customer's bottle may be rinsed through an ozone rinse system at block 630 to eliminate any bacteria or virus existing in the customer's bottle, for example, by up to 99.9%, by ozonated water. The customer may be provided the option at block A of purchasing the purified water as-is, oxygenated water generated from the purified water, or alkaline water generated by the purified water.

In more detail, referring to FIG. 4B, from block A, the customer may be presented the option of purchasing purified water at block 632, oxygenated water at block 636, and/or alkaline water at block 642. When the customer desires to purchase the purified water (e.g., YES at block 632), the purified water may be pumped from the RO-mate, subjected to UV light through the UV-system, dispensed at block 634 into the customer's ozone-rinsed bottle, and the method 600 may end.

When the customer desires to purchase the oxygenated water (e.g., YES at block 636), the purified water may be pumped from the RO-mate, subjected to UV light through the UV-system, and injected with oxygen at block 638, for example, using an injector following Bernoulli's principle. The water injected with oxygen may be dispensed at block 640 into the customer's ozone-rinsed bottle, and the method 600 may end.

When the customer desires to purchase the alkaline water (e.g., YES at block 642), the purified water may be pumped from the RO-mate, subjected to UV light through the UV-system, and may flow into an automatic alkaline water system. The flow rate of the purified water flowing into the automatic alkaline water system may be determined by a water regulator at block 644. As discussed above, the flow rate (e.g., pressure and speed) of the water may significantly determine the pH level of the alkaline water. The water may be fed to an alkaline filter at block 646 to synthesize with minerals in the alkaline filter, and may be further filtered through a sediment filter at block 648 to filter out fine particles that may arise while passing through the alkaline filter. The alkaline water output by the sediment filter may be stored in an alkaline water reserve tank at block 650, and the alkaline water may be dispensed at block 652 into the customer's ozone-rinsed bottle, such that the method 600 may end.

What is claimed is:

1. A water filtering system, comprising:
   at least one filter;
   a first water tank configured to store water filtered by the at least one filter;
   a second water tank configured to store water, the second water tank being in fluid communication with the first water tank;
   an air generator configured to aerate the water stored in the first water tank by generating one or more air bubbles to agitate the water stored in the first water tank;
   an ozone generator comprising an ozone injector configured to inject ozone generated by the ozone generator into water flowing from the first water tank to the second water tank to generate ozonated water that is stored in the second water tank;
   an alkaline system comprising:
      a water regulator configured to adjust a flow rate of the water stored in the second water tank flowing into an alkaline filter;
      a solenoid valve configured to control a flow of the water flowing into the alkaline filter;
      the alkaline filter configured to introduce minerals into the water flowing into the alkaline filter to convert the water into alkaline water; and
      a sediment filter configured to filter out particles in the alkaline water; and
   a dispenser configured to dispense various kinds of water generated from the ozonated water stored in the second water tank.

2. The water filtering system of claim 1, wherein the filter comprises at least one of a 5-micron filter or a 20-micron filter.

3. The water filtering system of claim 1, wherein the second water tank comprises a pressure tank.

4. The water filtering system of claim 1, further comprising a UV system configured to emit UV light to expose water flowing from the second water tank to the dispenser to the UV light.

5. The water filtering system of claim 1, wherein the dispenser comprises:
   a first fluid conduit in fluid communication with a first outlet, the first outlet being configured to dispense purified water, and
   a second fluid conduit in fluid communication with a second outlet, the second outlet being configured to dispense oxygenated water.

6. The water filtering system of claim 5, further comprising: an oxygen generator in fluid communication with the second fluid conduit, the oxygen generator configured to generate oxygen that is injected into the ozonated water flowing from the second water tank to the dispenser to generate the oxygenated water, wherein the dispenser is configured to dispense the oxygenated water through the second outlet.

7. The water filtering system of claim 5, the dispenser further comprising a third fluid conduit in fluid communication with a third outlet,
   wherein the dispenser is configured to dispense the alkaline water through the third outlet.

8. The water filtering system of claim 1, further comprising an ozone generator protector configured to prevent a reverse flow of water from flowing from the ozone injector to the ozone generator by draining the water before flowing to the ozone generator.

9. A water filtering system, comprising:
   at least one filter;
   a first water tank configured to store water filtered by the at least one filter;
   a second water tank configured to store water, the second water tank being in fluid communication with the first water tank;
   an ozone generator comprising an ozone injector configured to inject ozone generated by the ozone generator into water flowing from the first water tank to the second water tank to generate ozonated water that is stored in the second water tank;
   a UV system configured to emit UV light to expose the ozonated water flowing out from the second water tank to the UV light;
   an alkaline system comprising:
      a water regulator configured to adjust a flow rate of the ozonated water exposed to the UV light flowing into an alkaline filter;
      a solenoid valve configured to control a flow of the water flowing into the alkaline filter:
      the alkaline filter configured to introduce minerals into the water flowing into the alkaline filter to generate alkaline water; and
      a sediment filter configured to filter out particles in the alkaline water; and
   a dispenser configured to dispense various kinds of water generated from the ozonated water exposed to the UV light.

10. The system of claim 9, wherein the dispenser comprises:
    a first fluid conduit in fluid communication with a first outlet, the first outlet being configured to dispense purified water; and
    a second fluid conduit in fluid communication with a second outlet, the second outlet being configured to dispense oxygenated water.

11. The system of claim 10, further comprising an oxygen generator in fluid communication with the second fluid conduit, the oxygen generator configured to generate oxygen that is injected into the ozonated water exposed to the UV light to generate the oxygenated water, wherein the dispenser is configured to dispense the oxygenated water through the second outlet.

12. The system of claim 10, wherein the dispenser further comprises a third fluid conduit in fluid communication with a third outlet.

13. The system of claim 12, wherein the dispenser is configured to dispense the alkaline water through the third outlet.

14. The system of claim 13,
wherein the water regulator is configured to adjust a pH value of the alkaline water by controlling the flow rate, and
wherein the flow rate is increased to lower the pH value, and the flow rate is decreased to increase the pH value.

* * * * *